Figure 12:
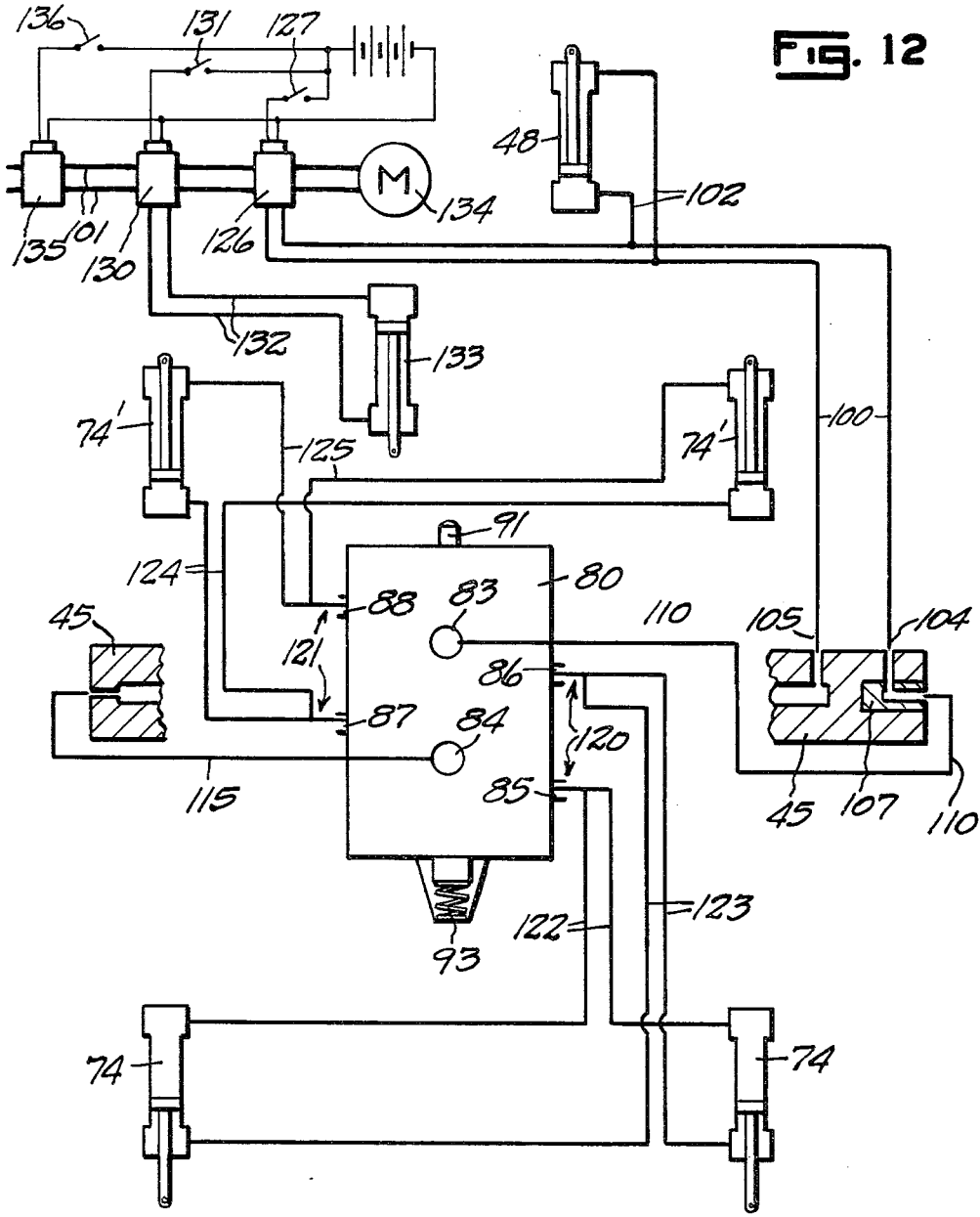

Feb. 1, 1966  G. N. ROMINE ETAL  3,232,465
TWO-WAY FORK STRUCTURE FOR A SIDE SHIFTING LOAD CARRIER
Filed April 24, 1962  5 Sheets-Sheet 1
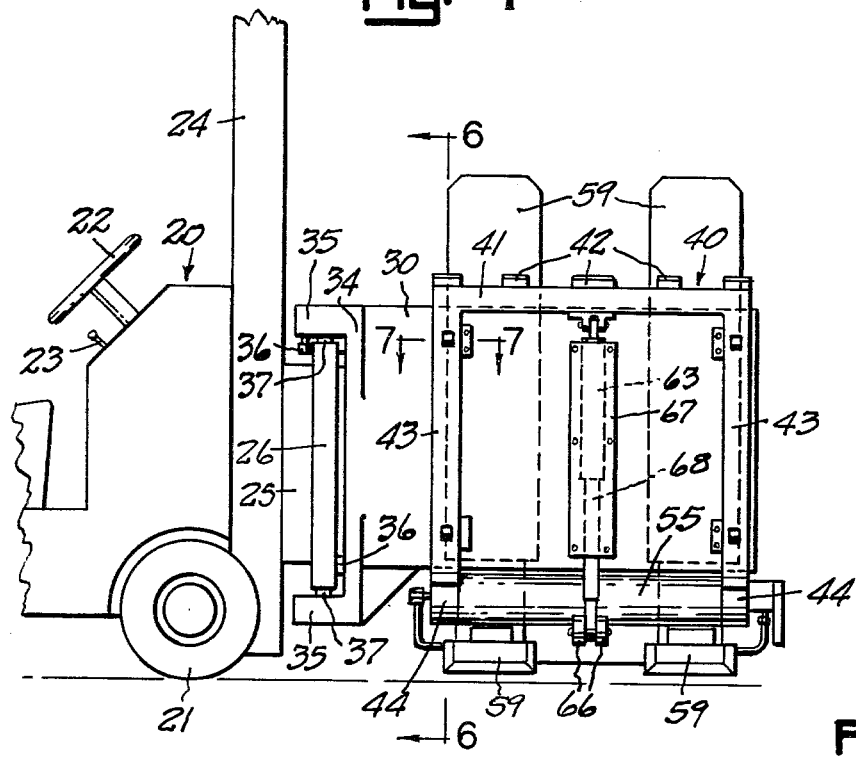
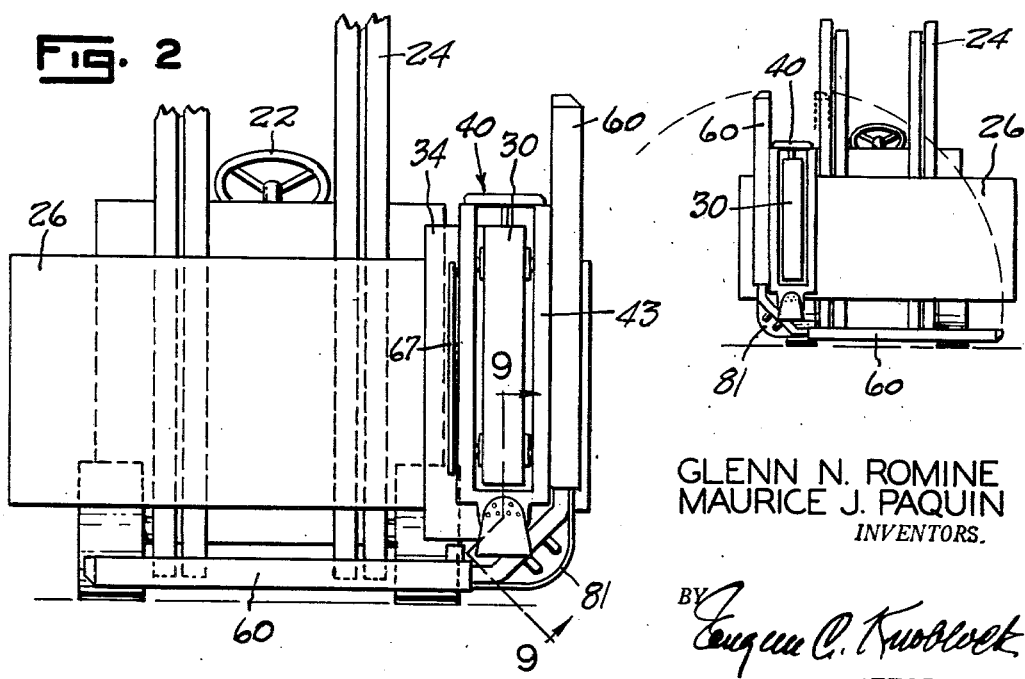
GLENN N. ROMINE
MAURICE J. PAQUIN
*INVENTORS.*
BY
*Eugene C. Knoblock*
ATTORNEY Feb. 1, 1966  G. N. ROMINE ETAL  3,232,465
TWO-WAY FORK STRUCTURE FOR A SIDE SHIFTING LOAD CARRIER
Filed April 24, 1962  5 Sheets-Sheet 2
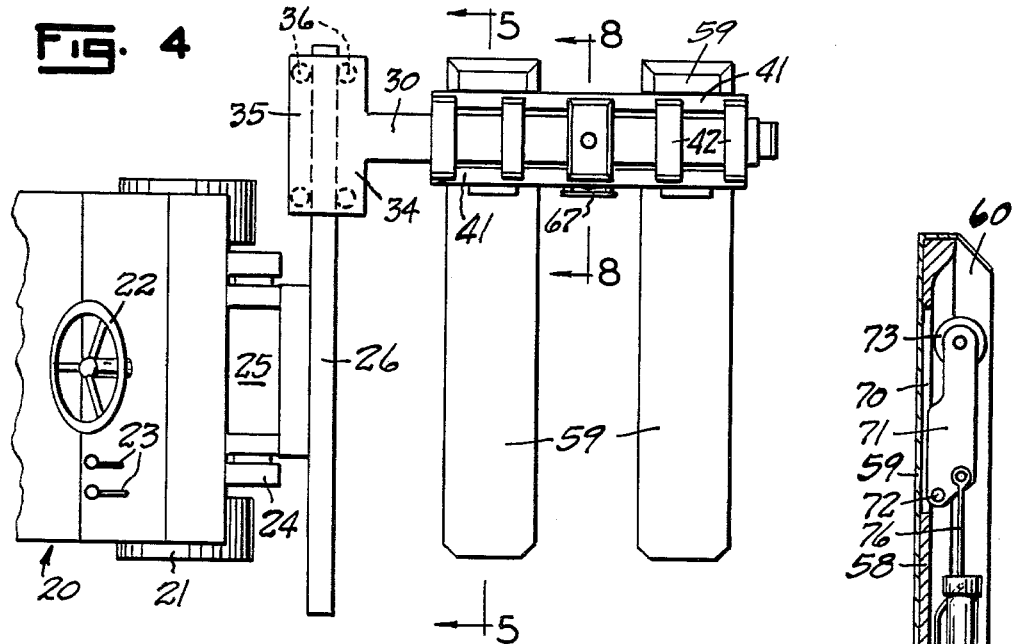
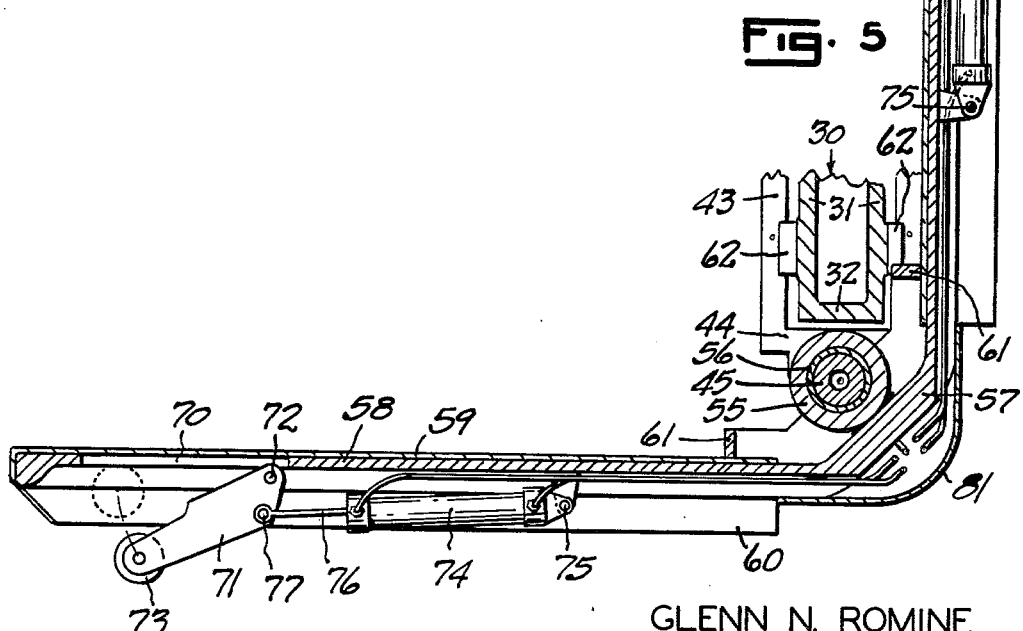
GLENN N. ROMINE
MAURICE J. PAQUIN
INVENTORS.
BY
ATTORNEY Feb. 1, 1966  G. N. ROMINE ETAL  3,232,465
TWO-WAY FORK STRUCTURE FOR A SIDE SHIFTING LOAD CARRIER
Filed April 24, 1962  5 Sheets-Sheet 3
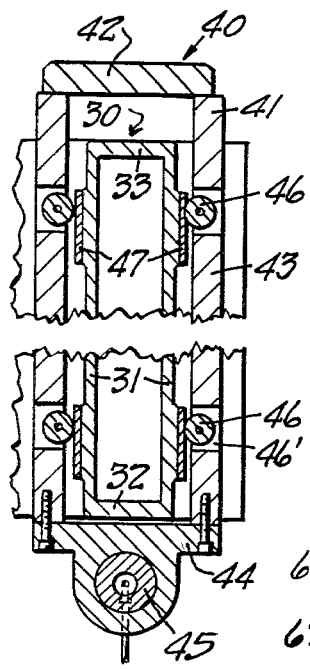
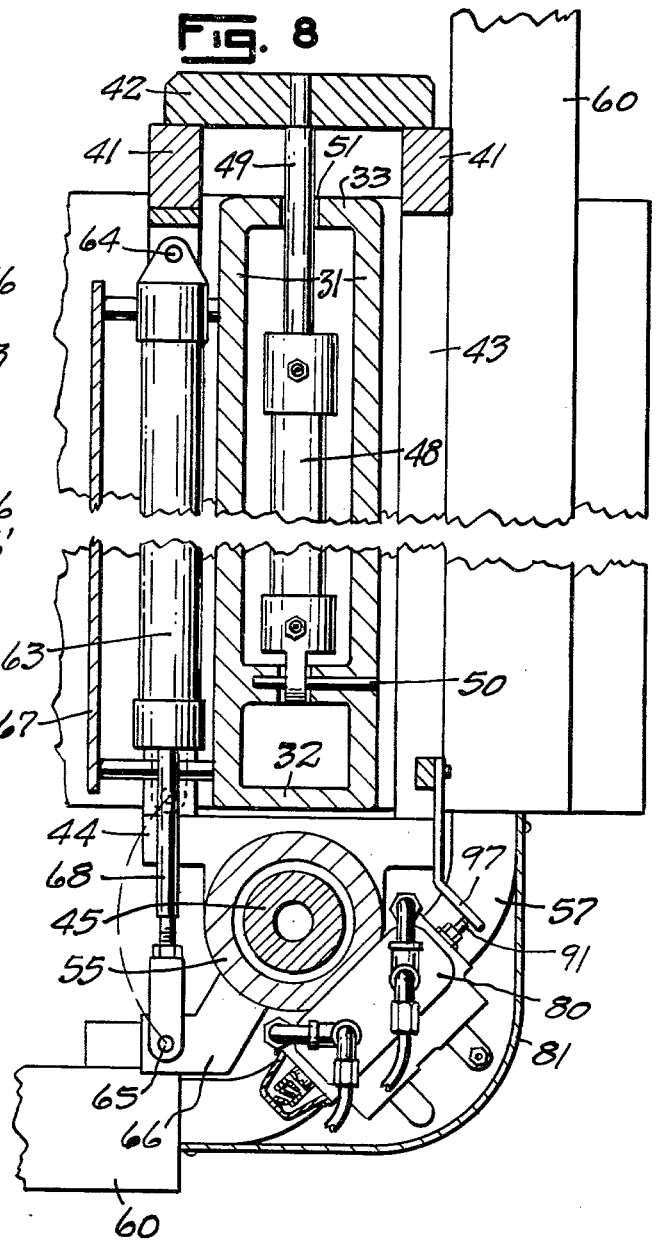
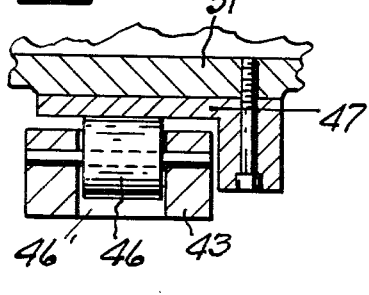
GLENN N. ROMINE
MAURICE J. PAQUIN
INVENTORS.
BY
Eugene C. Kublock
ATTORNEY Feb. 1, 1966 G. N. ROMINE ETAL 3,232,465
TWO-WAY FORK STRUCTURE FOR A SIDE SHIFTING LOAD CARRIER
Filed April 24, 1962 5 Sheets-Sheet 4
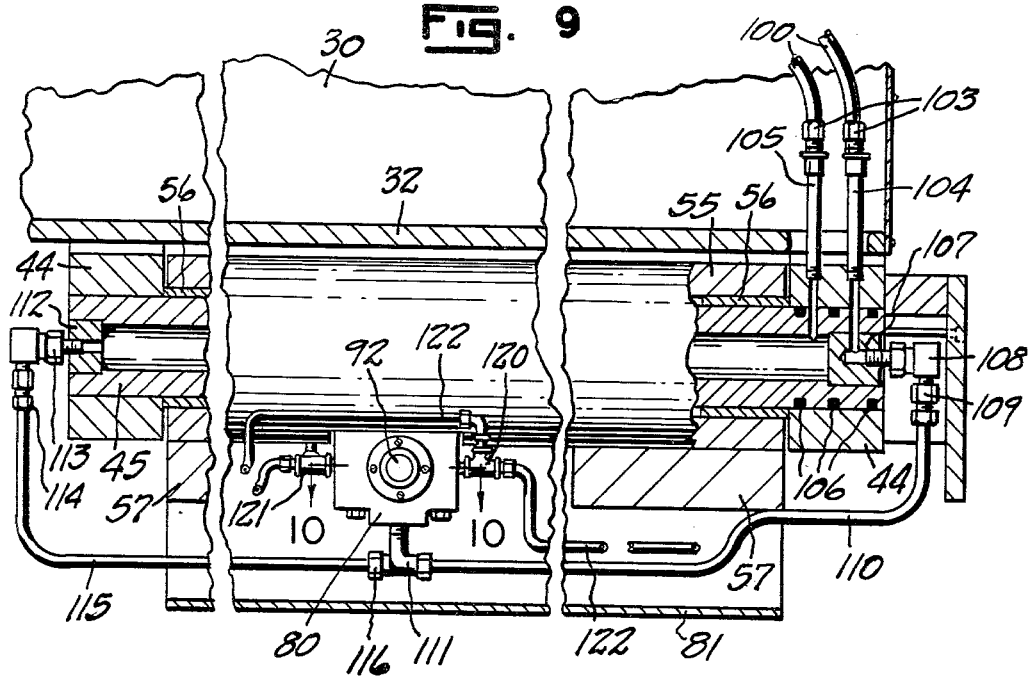
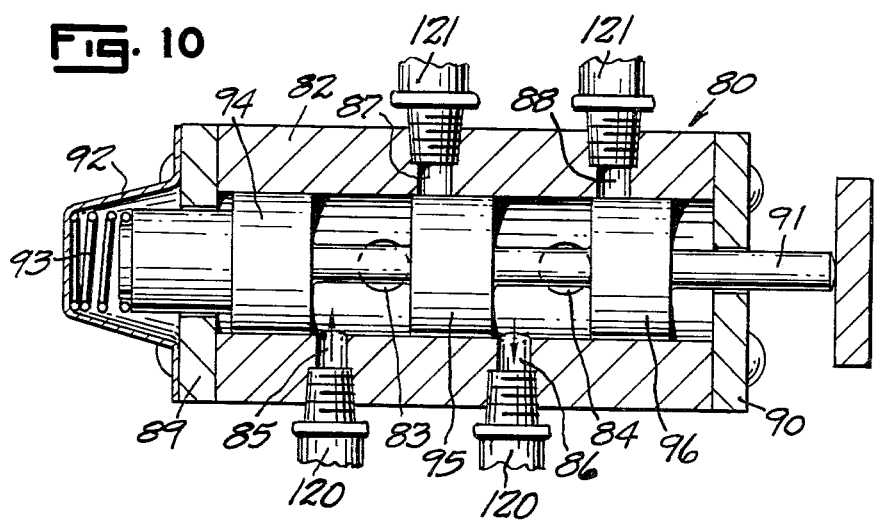
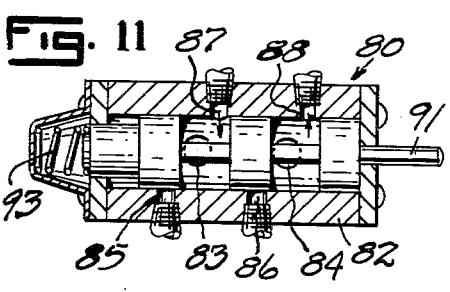
GLENN N. ROMINE
MAURICE J. PAQUIN
INVENTORS.
BY
Eugene C. Knoblock
ATTORNEY

GLENN N. ROMINE
MAURICE J. PAQUIN
INVENTORS.

United States Patent Office 3,232,465
Patented Feb. 1, 1966

3,232,465
TWO-WAY FORK STRUCTURE FOR A
SIDE SHIFTING LOAD CARRIER
Glenn N. Romine, Wayne, Mich., and Maurice J. Paquin, Ridgewood, N.J., assignors to Rack Specialists, Inc., South Bend, Ind., a corporation of Indiana
Filed Apr. 24, 1962, Ser. No. 189,782
14 Claims. (Cl. 214—730)

This invention relates to a two-way side shifting load carrier, and constitutes an improvement upon devices of the character covered by the patent of Rowland L. Sylvester and Glenn N. Romine for Load Transfer Means, No. 2,804,218, dated August 27, 1957, and the patent of Rowland L. Sylvester and Theodore M. Arnold for Side Loading Transfer Device, No. 2,941,686, dated June 21, 1960.

The side shifting load carriers of the type here involved are particularly designed for use upon load-supporting vehicles, such as fork lift trucks, or upon overhead load carriers.

In both cases the load carriers are adapted to traverse an aisle between storage racks or storage areas or an access space alongside a storage rack, and the side transfer means includes a laterally shiftable part supporting fork arms or other load-engaging means, which are shiftable independently of the supporting vehicle so as to enter a storage rack while loaded to deposit a load therein or to enter and withdraw from a rack for the purpose of picking up a load from the rack for transport to another location. Devices of this character have usually required means permitting a transfer of a portion of a load being carried thereby when in laterally projected position to the rack so as to avoid lateral unbalance of the mechanism and the truck by which it is carried. Mechanisms of this character usually require that the load-supporting means projecting laterally relative to the carrier be oriented in a predetermined relation so that they are operative to pick up a load or to deposit the same from one side only of the vehicle. This tends to somewhat limit the utility of the vehicle, in that it requires the vehicle to approach the load-bearing rack or the rack at which the load is to be deposited from a given direction to permit proper orientation of the load carrier to the rack. It is frequently desirable in use of apparatus of this character to have the apparatus adapted for two-way operation; that is, to make it possible for a device of this character to pick up from and to deposit in racks at either of two sides of the vehicle, thus providing two-way lateral load-carrying side shifting.

It is the primary object of this invention to provide apparatus which will permit such two-way operation of a side-shifting load carrier.

A further object is to provide a device of this character having a support to which is pivoted on a horizontal axis an L-shaped structure in such a manner that one part thereof may project laterally while the other part thereof is positioned vertically, and such that the position of these parts can be readily reversed at will.

A further object is to provide a device of this character having a novel and simple rugged trouble-free construction which requires minimum time and manipulation to condition for selected operation.

A further object is to provide a device of this character having novel control means for facilitating position and sequential operation of the parts thereof as required for use in picking up and depositing loads and transporting loads from one location to another.

Other objects will be apparent from the following specification.

In the drawings:
FIG. 1 is a view of the device in side elevation, illustrating partially a vehicle upon which the same is mounted;
FIG. 2 is a fragmentary front elevation view of the device and vehicle, as seen from the right in FIG. 1;
FIG. 3 is a reduced front view of the device illustrating the same mounted upon a vehicle and adjusted in a different operating position than that shown in FIG. 2;
FIG. 4 is a top plan view of the device mounted upon a vehicle shown fragmentarily;
FIG. 5 is an enlarged vertical sectional view taken on line 5—5 of FIG. 4;
FIG. 6 is a fragmentary vertical sectional view taken on line 6—6 of FIG. 1;
FIG. 7 is a fragmentary detail sectional view taken on line 7—7 of FIG. 1;
FIG. 8 is a fragmentary enlarged vertical sectional view taken on line 8—8 of FIG. 4;
FIG. 9 is an enlarged fragmentary sectional view taken on line 9—9 of FIG. 2;
FIG. 10 is an enlarged detail axial sectional view of a valve taken on line 10—10 of FIG. 9;
FIG. 11 is another view taken on line 10—10 of FIG. 9 and illustrating the valve thereof in a different operating position; and
FIG. 12 is a schematic view illustrating a hydraulic system usable with the device for the control thereof.

Referring to the drawings which illustrate one embodiment of the invention, the numeral 20 designates a load carrying vehicle, such as a fork lift truck of the counterbalanced type which may be provided with dirigible wheels 21, steering mechanism 22, controls 23 for both the drive of the vehicle and for a hydraulic system (not shown) which may include the usual reservoir, pump and control valves. The vehicle may also include a vertical mast structure 24 of any suitable character adapted to be traversed by a load carrier 25 under the control of controls 23. The load carrier 25 may include a rigid backing plate 26 which is elongated transversely of the direction of travel of the vehicle, whose vertical dimension is substantial, and which provides a plurality of elongated horizontal guide surfaces or tracks.

A rigid traverse cantilevered frame structure 30 is mounted upon the backing plate 26 to extend forwardly therefrom and to move from one end to the other of the backing plate while maintaining a predetermined vertical relationship to the supporting surface upon which the vehicle travels, or with respect to racks (not shown) into which a load may be deposited or from which a load may be taken. As here illustrated, the traverse frame 30 includes an elongated rigid hollow structure having side walls 31, bottom wall 32, and top wall 33. At one end the traverse frame 30 has a cross-head portion 34 of rigid character including substantially horizontal plate portions 35 which extend above and below the backing plate 26. The cross-head structure 34, 35 mounts a plurality of rollers 36 engaging opposite side portions or wall portions of the backing plate 26 at the upper and lower parts thereof and also mount rollers 37 bearing on the upper and lower surfaces of the backing plate 26. The rollers 36 and 37 are so positioned as to guide the movement of the traverse frame 30 along the backing plate 26 and to maintain the frame in vertical position extending perpendicularly to the backing plate in all adjustments as it moves along the length of the backing plate both while loaded and unloaded. Any suitable means (not shown), such as chains and cooperating drive means carried by the backing plate 26 and the traverse frame 30, may be provided for moving the traverse frame 30. One example of such a chain means is shown in Pat. No.

2,941,686. Another example of such means is shown in the patent of Rowland L. Sylvester and Delavan J. Arnold, No. 3,025,986, dated March 20, 1962.

A fork support frame 40 is mounted upon the traverse frame 30. Fork support frame 40 preferably includes a pair of spaced parallel rigid horizontal upper members 41 positioned at opposite sides of the traverse frame 30 and interconnected by a plurality of rigid transverse cross members 42 which preferably are spaced apart. Upright frame members 43 depend from the frame members 41 at opposite ends thereof and at opposite sides of the frame 30 with which they have clearance. The lower ends of the upright members 43 are interconnected by bracket members 44 to which are rigidly secured, as by welding, the opposite ends of a rigid tube structure 45. The uprights of the fork support frame 40 preferably have apertures therein as illustrated at 46' within which are located rollers 46 journaled suitably to the upright members 43 and preferably traversing vertically elongated guide surfaces or wear plates 47 carried by the traverse frame, as illustrated in FIG. 6 and serving to orient the fork support frame to the traverse frame and to guide its movement from one position to another, both while loaded and unloaded. The fork support frame is adapted to be elevated and lowered relative to the traverse frame by a power operated lift means, here illustrated as a cylinder 48 having a piston stem 49 projecting therefrom and secured to one of the cross members 42 of the fork support frame, as illustrated in FIG. 8. The lower end of the cylinder is suitably secured to the traverse frame as by pivoting thereof at 50 to said frame. The cylinder 48 is positioned within the traverse frame and its piston stem projects freely through an opening 51 in the top wall 33 of the traverse frame. It will be observed that the spacing between the cross members 42 and the tube 45 of the fork support frame is greater than the vertical dimension of the traverse frame 30 so that energization of the cylinder 48 will permit elevating and lowering of the fork support frame relating to the traverse frame.

An L-shaped fork unit is pivoted to the fork support frame. As here illustrated, this unit comprises a pair of parallel L-shaped rigid fork structures rigidly interconnected in predetermined spaced relation at their mid sections by a pivot or journaled sleeve structure. The journal structure preferably includes an elongated rigid sleeve 55 encircling the tube 45 with clearance between the brackets 44 and journaled on the tube 45 by bearings 56. Sleeve 55 has welded thereto adjacent each end thereof one of a pair of L-shaped rigid fork members at a central portion 57 from which project a pair of fork arm structures 58 preferably arranged perpendicular to each other and symmetrically relative to the central part 57 which preferably extends obliquely between them, as best illustrated in FIG. 5. Each fork arm 58 preferably has secured thereto a fork covering portion of inverted channel shape and including a plate portion 59 and fork flange portions 60. The fork frame central portion 57 preferably mounts central stop means 61 engageable with portion 62 of the traverse frame to limit the angle through which the fork structure may swing to approximately 90 degrees, as between the positions here illustrated in FIGS. 2 and 3. The pivotal movement of the fork units is produced by any suitable means and, as here illustrated, a hydraulic pressure member may be utilized. Thus, as illustrated in FIG. 8, a cylinder 63 of a power member, preferably of the double-acting type, may be pivoted at 64 to the upper portion of the fork support frame. A piston unit forming a part of the positioning member has a stem 68 projecting from the lower end of the cylinder and pivotally connected at 65 to one or more ears or bracket arms 66 projecting from the sleeve 55. A protecting plate 67 is preferably carried by the traverse frame 30 and serves to prevent contact of a load on a fork with the power member 63.

Each fork arm is provided with means selectively operable for supporting the free end thereof. Thus, as illustrated in FIG. 5, each fork support 58 preferably has an aperture 70 adjacent its free end which may be covered by the plate 59 and which accommodates a retracted position of an elongated leg or strut 71 pivoted at 72 to the fork frame 58 adjacent the inner end of the opening 70 and journaling at its free or outer end a roller 73. A double-acting power member, such as a cylinder 74, is pivoted at one end at 75 remote from the strut 71 to the fork frame 58. The power member includes a piston having a stem 76 which is pivotally connected at 77 to the leg 71 spaced from the pivot 72 of said leg. The parts are preferably so oriented and related to each other that the power member 74, the strut 71, and the roller 73 may all be positioned within the confines and outline of the fork arm between the fork flange portions 60, as illustrated in the upper right portion of FIG. 5, but upon energization of the power member 74, may cause the strut 71 to be pivoted to extend angularly relative to the fork and position its roller 73 in supporting relation, as illustrated at the lower left portion of FIG. 5.

A control valve 80 for selectively controlling the roller positioning member 74 is mounted upon the sleeve 55 within the confines of a guard plate 81 carried by the central portion 57 of the fork units. The valve is preferably of the type illustrated in FIGS. 10 and 11, having a cylindrical or tubular housing 82 having a plurality of radial ports arranged in pairs therein, with the ports of each pair being spaced longitudinally. Thus one pair of ports 83, 84 is located substantially in alignment and spaced both radially and longitudinally from the ports 85 and 86 of a second pair, and similarly spaced radially and longitudinally in an opposite direction from the ports 87 and 88 of a third pair. The opposite end plates 89 and 90 of the valve housing 82 are centrally apertured to slidably receive portions of an elongated valve stem 91 projecting therethrough. A spring housing 92 is carried by end plate 89 and encloses a spring 93 against which the adjacent end of the valve stem 91 abuts. Three lands or valving portions 94, 95 and 96 are carried by the valve stem 91 in longitudinally spaced relation, all having a snug sealing fit in the bore of the valve housing and preferably being spaced apart a distance greater than the longitudinal spacing between adjacent ports so that two adjacents ports of different pairs may be positioned in fully communicating relation, as illustrated in FIGS. 10 and 11 while closing off a port of the third pair. The fork support frame 40 preferably mounts a valve actuator 97 engageable with the valve stem 91, as illustrated in FIGS. 8 and 10 in one operative position of the parts and acting to press the valve stem 91 longitudinally against the action of the spring 93 from the position shown in FIG. 11 to that shown in FIG. 10, so as to reverse the setting of the valve from a normal spring urged setting.

Flexible lines or conduits 100 extend through the traverse frame 30 for connection to lines 101 of a fluid pressure system including a pump or other source of fluid pressure (not shown) upon the vehicle. Lines 102 branch from the conduits 100 and extend to the cylinder or power member 48 located within the traverse frame and operative to control the elevation of the fork support frame on the traverse unit. The lines 100 are connected by fittings 103 with rigid conduits 104 and 105, respectively, which extend through an opening in the bottom wall 32 of the traverse frame 30, as seen in FIG. 9. The conduits 104 and 105 communicate with longitudinally spaced passages in a bracket 44 and in one end portion of the tube 45. The conduit 105 communicates with the bore of the tube 45. A plurality of spaced annular seals 106 between the bracket 44 and the tube 45 prevent leakage between these parts from the bores with which tubes 104 and 105 communicate. A plug 107 is welded or otherwise secured in the end of the bore of tube 45 and has an L-shaped passage therethrough with which is connected a swivel coupling 108. A fitting 109 is connected to the swivel coupling 108 and provides connection with conduit 110 whose opposite end is connected by a fitting 111 to one of a pair of ports 83, 84 of valve 80, here illustrated as port 83. At the opposite end of the tube 45 a plug 112 is welded or otherwise sealingly secured in the bore of said tube and has a passage therethrough with which communicates a swivel coupling 113 which is connected by a fitting 114 to a conduit 115 connected by a fitting 116 to another port of the pair 83, 84, and here shown as the port 84. Inasmuch as the tube 45 is held stationary by the brackets 44 and does not rotate incident to change of the pivotal position of the forks, and, further, inasmuch as the conduits 104 and 105 have free play in the traverse frame to accommodate vertical movement of the fork support frame, the above described arrangement provides flow of fluid under pressure to the valve 80 in all operating positions of the device.

A T-fitting, such as 120, is connected to each of the ports 85 and 86. A T-fitting 121 is connected to each of the ports 87 and 88. A pair of flexible conduits 122 extend from the T-fitting 120 connected with the port 85 and a pair of flexible conduits 123 extend from the T-fitting 120 connected with the port 86. The conduits 122 extend to the cylinders 74 carried by the forks of one set so that fluid pressure flowing therethrough will act simultaneously and in the same direction upon the piston in each of the two cylinders 74. The conduits 123, which are connected to a T-fitting 120 at the valve port 86, are connected to the same cylinders 74 to which conduits 122 are connected, but at the opposite ends of said cylinders so that they apply fluid pressure equally to the pistons of power members 74 in a direction opposite that in which the pressure in lines 122 acts upon members 74.

A pair of flexible conduits 124 are connected with the T-fitting 121 at the valve port 87 and are connected in turn to the power members 74' of the pair in the set of fork arms extending at right angles to the fork arms carrying the power members 74 and are connected to apply fluid pressure to members 74' in the same direction. A pair of flexible conduits 125 are connected to the opposite ends of the power members 74' and to the T-fitting 121 connected with the valve port 88.

By this arrangement, the operation of the valve 80 serves to simultaneously and equally control and actuate the rollers in the operative set of forks. Valve 80 is actuated by the member 97 pressing against the plunger 91 and its spring 93 in such a manner as to condition the fluid system for operating the rollers in the fork arms of one set when positioned horizontally in load-supporting position. The normal spring-urged setting of the valve conditions the fluid system for operating the rollers of the other set of fork arms when lowered. Thus in the setting of valve 82, as shown in FIG. 10, fluid from port 86 will flow through conduits 123 to the roller actuating power members 74, and fluid displaced from the power members 74 will flow through the lines 122 to the valve port 85. At this time, both of the lines 124 and 125 are cut off from communication with the valve 80. Upon a reverse setting of the valve 80 shown in FIG. 11, flow is reversed to condition power members 74' for energization. Primary control of the fluid pressure in the system is effected by a valve 126, such as a solenoid valve at the junction of the conduits 100 and 101. Valve 126 is actuated by the operator at a control panel, as through manipulation of one of the controls 23. Thus a manual switch 127 on the dash or instrument panel of the vehicle may be manipulated to set valve 126 and control flow to and through the lines 100 and connected parts.

The hydraulic system of the unit may also include another control valve 130, such as a solenoid valve, responsive to a switch 131 at the operator's panel and serving to control flow or fluid from main line 101 to and through conduits 132 which lead to a power member or cylinder 133 so connected to the mast 24 of the vehicle as to tilt the same in the manner well understood in the art. The hydraulic circuit of the unit may also include a motor 134, which motor may be used to serve any desired function on the vehicle, such as the function of elevating the backing plate 26 on the mast and lowering the same, or the function of moving the traverse frame 30 or the backing plate 26. The hydraulic system may also include a master control valve 115 in the supply line 101, such as a solenoid valve under the control of a switch 136 located at the control panel of the vehicle 20.

The unit has two operative positions of the fork arms thereof, as illustrated respectively in FIGS. 2 and 3. These positions are selected by actuation of the power member 63 which can be effected by a valve (not shown) connected to the fluid line 101 as will be obvious. In each of the two operative extreme positions, one set of fork arms extends substantially horizontally, and the other set of fork arms extends substantially vertically. The two sets of fork arms are interconnected, and the cantilevered load-supporting horizontal set of fork lift arms is positioned horizontally in load-sustaining manner by the engagement of the vertical or inactive set of forks with the fork support frame or the traverse frame so as to stabilize the fork unit in both adjustments.

In the use of the device, assuming that the fork-carrying vehicle has been positioned at desired or selected location with the forks at an elevation according to the requirements of the intended use of the unit, and assuming further that the fork unit has been adjusted to the position illustrated in FIGS. 1, 2 and 3 which enables the forks to move to the right to pick up and deposit a load, the following sequence of operation occurs when a load is to be removed from a rack. The vehicle or support for the side shifting mechanism is first moved alongside the location upon a storage rack or other support at which the load is to be removed or deposited. Neither the rack nor the load is here illustrated, but it will be understood that the rack will include trackways spaced to be engaged by the fork rollers 73, and that the load will be mounted upon a skid, a pallet or other load carrier (not shown) having a clearance space below the load through which the fork arms may be inserted and withdrawn from load-supporting position.

In loading, when the horizontal fork arms 59 have entered the space below the load, the valve 126 is energized to simultaneously elevate the fork support frame 40 upon the traverse frame 30 by energization of the power unit 48, and to lower the struts 71 to cause the rollers 73 to engage the tracks of the rack by energization of the power members associated with the horizontal forks. This operation continues until such time as the forks have lifted the load clear of the rack. Thereupon, the carrier 30 is returned along backing plate 26 toward the position shown in FIG. 4, carrying the load with it so as to withdraw the load from the rack or other support to a position aligned with and forwardly of the vehicle 20 or other mechanism carrying the side transfer unit. During this load withdrawal the free ends of the cantilevered operative or load-supporting fork arms are supported by rollers 73 traveling along a support until the load is substantially withdrawn from the rack and is substantially aligned with the vehicle so that lateral unbalance of vehicle 20 is limited. Thereupon, the vehicle can proceed to a station at which the load is to be discharged, whereupon a reverse operation occurs. Specifically, this reverse operation includes positioning of the side shifting means upon the vehicle mast at the elevation at which the load is to be discharged, and then shifting the traverse frame 30 along the backing plate 26 while permitting the rollers of the load-carrying forks to engage the surface upon which the load is to be discharged for support of the forks at their tips as they advance laterally onto the surface which is to receive the load. When the load has reached its desired deposit position, the valve mechanism 126 is actuated in a manner to shift the legs 71 from their lowered inclined position to an upper inoperative position, thereby lowering the load upon the support and providing clearance between the forks and the load incident to lowering of the fork support frame 40 relative to the traverse frame 30. Thereupon the traverse frame 30 can be run back along the backing plate 26 toward the normal travel position thereof, as illustrated in FIG. 4.

It is interesting to observe that the functioning of the various controls for the device to achieve load pickup and delivery or discharge occurs similarly regardless of which of the two operating positions of the fork unit, as illustrated in FIGS. 2 and 3, exists. In other words, by virtue of the fact that valve 80 has one setting in one position which selects for operation the power members associated with the lowered or load-carrying fork rollers, and by virtue of the fact that the power member 63 is independent and separate from the other mechanisms, the same sequence of valve manipulation occurs regardless of whether the power members 74 or power members 74′ are to be energized.

The unit has a number of advantages. It has strength coupled with minimum weight so as to avoid excessive consumption of the load-carrying capacity of the fork lift truck 20 or other vehicle to carry the attachment itself; it has adequate strength to carry large loads. The unit accommodates quick change of position of the fork sets to change from right-hand to left-hand operation, and it also accommodates a simple arrangement of hydraulic controls which operate similarly whether the fork unit is set for right-hand or left-hand operation. Simplicity of construction renders the device substantially trouble-free and easily repaired, if necessary.

While the preferred embodiment of the invention has been illustrated and described, it will be understood that changes in the construction may be made within the scope of the appended claims without departing from the spirit of the invention.

We claim:

1. A device for carrying a load mounted on an elevated support, comprising
a vehicle,
a horizontal track means extending transversely of and shiftable vertically on said vehicle,
a cantilevered traverse frame extending perpendicularly from and shiftable along said track means transversely of said vehicle,
a fork support frame carried by said traverse frame,
a fork unit pivoted to said fork support frame between two operative load-carrying positions on a substantially horizontal axis substantially perpendicular to said track means,
said fork unit including two sets of forks extending substantially perpendicular to each other and each engaging said fork support frame while the other is in load-carrying position,
a retractable wheeled support carried by the free end of each fork, and
means for selectively lowering and retracting said wheeled supports.

2. A device for carrying a load mounted on an elevated support, comprising
a vehicle,
horizontal track means extending transversely of and shiftable to selected elevation on said vehicle,
a cantilevered traverse frame shiftable along said track means transversely of said vehicle,
a fork support frame carried by and shiftable vertically on said traverse frame,
a fork unit pivoted to the lower part of said fork support frame between two operative positions on a substantially horizontal axis substantially perpendicular to said track means,
said fork unit including two sets of forks extending substantially perpendicularly to each other and each engaging said fork support frame in one of said operative positions,
a retractable wheeled support carried by the free end of each fork, and
means for selectively lowering and retracting the wheeled supports in said substantially horizontal load-carrying position.

3. A device for carrying a load mounted on an elevated support, comprising
a vehicle,
horizontal track means extending transversely of said vehicle at selected elevation,
a cantilevered traverse frame extending perpendicularly from and shiftable along said track means transversely of said vehicle,
a fork support frame carried by said traverse frame,
a fork unit pivoted to the lower part of said fork support frame between two operative positions on a substantially horizontal axis, substantially perpendicular to said track means,
said fork unit including two sets of forks extending substantially perpendicularly to each other and each engaging the support frame in one operative position,
a retractable wheeled support carried by the free end of each fork,
means for selectively lowering and retracting said wheeled supports, and
means for elevating and lowering said fork support frame and fork unit on said traverse frame.

4. A device for carrying a load mounted on an elevated support, comprising
a vehicle,
horizontal track means extending transversely of said vehicle at selected elevation,
a cantilevered traverse frame projecting outwardly from and shiftable along said track means transversely of said vehicle,
a fork support frame carried by said traverse frame,
a fork unit pivoted to said fork support frame between two operative positions on a substantially horizontal axis substantially perpendicular to said track means,
said fork unit including two sets of forks extending substantially perpendicular to each other,
means for positioning said fork unit at a selected operative position with a selected set of forks in substantially horizontal load-carrying position, and the other set in engagement with said fork support frame,
selectively operable double acting power actuated means carried by each fork, and
a drop wheel unit pivoted to each fork and shiftable between retracted and extended positions by said last named means.

5. In combination,
a power operated load transporting device,
a cantilevered traverse unit carried by and projecting from said device and shiftable vertically on said device to selected elevation and laterally of said device in a predetermined path to a selected position,
a rigid fork unit pivotally supported on said traverse unit on a substantially horizontal axis substantially perpendicular to said lateral path,
means for selectively elevating and lowering said fork unit relative to said traverse unit,
said fork unit including two sets of forks extending in angular relation to each other,
a retractable roller carried by each fork adjacent its free end and shiftable between a position retracted in said fork and a position projecting from said fork,
means for selectively pivoting said fork unit between two operative positions wherein one set of forks is substantially horizontal and the other set is substantially upright and engages said traverse unit, and
means for selectively shifting said retractable rollers.

6. In combination,
a power operated load transporting device,
a cantilevered traverse unit projecting from and carried by said device and shiftable vertically on said device to selected elevation and laterally of said device in a predetermined path to a selected position,
a fork carrier shiftable vertically on said transverse unit,
means for selectively elevating said fork carrier on said traverse unit,
a rigid fork unit pivoted to the lower part of said fork carrier on a substantially horizontal axis substantially perpendicular to said lateral path and parallel to the direction of travel of said device,
said fork unit including two sets of forks extending in angular relation to each other, and
means for selectively pivoting said fork unit between said two fork sets and between two operative positions, one of said sets of forks being upright and abutting said traverse unit in each operative position, the other set of forks being positioned substantially horizontally and laterally of said device in each operative position, one of said fork sets when horizontal extending to the right relative to the direction of travel of the device and the other fork set when horizontal extending to the left relative to the direction of travel of the device.

7. In combination,
a power operated load transporting device,
a cantilevered traverse unit projecting from and carried by said device and shiftable vertically on said device to selected elevation and laterally of said device in a predetermined path to a selected position,
a fork carrier shiftable vertically on said traverse unit,
means for selectively elevating said work carrier on said traverse unit,
a rigid fork unit pivoted to the lower part of said fork carrier on a substantially horizontal axis substantially perpendicular to said lateral path,
said fork unit including two sets of forks extending in angular relation to each other,
means for selectively pivoting said fork unit between two positions at each of which a different one of said sets of forks is positioned substantially horizontally, and the other set of forks abuts said fork carrier,
drop wheel mechanism carried by each fork, and
means for selectively actuating said drop wheel mechanism.

8. In combination,
a power operated load transporting device,
a cantilevered fork supporting unit projecting from and carried by said device and shiftable vertically to selected elevation and laterally in a substantially horizontal path to a selected position,
a rigid fork unit pivotally supported on the lower part of said supporting unit on a substantially horizontal axis substantially perpendicular to said lateral path,
said fork unit including two sets of forks extending in angular relation to each other and pivoted to said supporting unit between said fork sets,
means vertically shifting said fork unit on said supporting unit,
a retractable drop support carried by each fork adjacent its free end,
means for selectively pivoting said fork unit between two operative load-carrying positions at opposite sides of said fork supporting unit,
fluid pressure actuated means for lowering and retracting each retractable fork drop support, and
a fluid pressure system connected to said last named means and including a portion concentric with said fork pivot axis and a portion carried by each fork and rotatable relative to the portion concentric with said fork pivot axis.

9. In combination,
a power operated load transporting device,
a cantilevered fork supporting unit carried by said device and shiftable vertically to selected elevation and laterally in a substantially horizontal path to a selected position,
a rigid fork unit pivotally supported on the lower part of said supporting unit on a substantially horizontal axis substantially perpendicular to said lateral path and longitudinal of said device,
said fork unit including two sets of forks extending in angular relation to each other and pivoted adjacent to the junction of said fork sets,
means for elevating and lowering said fork unit on said supporting unit,
a retractable support carried by each fork adjacent its free end,
means for selectively pivoting said fork unit between two operative load-carrying positions at opposite sides of said fork support unit with one fork set engaging said fork-supporting unit in each position,
fluid pressure actuated means for projecting and retracting each retractable fork support when the associated fork set is in operative position,
a fluid pressure system connected to said last named means, and
a valve connected in said system and carried by said fork unit and responsive to the pivotal position of said fork unit to select the fluid pressure actuated means to be actuated.

10. In combination,
a power operated load transporting device,
a cantilevered fork supporting unit projecting from and carried by said device and shiftable vertically to selected elevation and laterally in a substantially horizontal path to a selected position,
a rigid fork unit pivotally supported on said supporting unit on a substantially horizontal axis substantially perpendicular to said lateral path,
said fork unit including two sets of forks extending in angular relation to each other,
means for vertically shifting said fork unit on said supporting unit,
a retractable support carried by each fork adjacent its free end,
means for selectively pivoting said fork unit between two operative load-carrying positions at opposite sides of said fork support unit, with one fork set engaging said fork supporting unit in each position,
fluid pressure actuated means for projecting and retracting each retractable fork support,
a fluid pressure system connected to said last named means,
a valve connected in said system and carried by and pivoted with said fork unit to condition for actuation the fluid pressure means of the operative set of forks,
said valve including a spring-urged actuator, and
an abutment carried by said fork-supporting unit in the path of said valve actuator to depress the same in one operative position of said fork unit.

11. In combination,
a power operated load transporting device,
a cantilevered fork supporting unit carried by and projecting from said device and shiftable vertically to selected elevation and laterally in a substantially horizontal path to a selected position,
a rigid fork unit pivotally supported on said supporting unit on a substantially horizontal axis substantially perpendicular to said lateral path,
said fork unit including two sets of forks extending in angular relation to each other, a retractable support carried by each fork adjacent its free end, means for selectively pivoting said fork unit between two operative load-carrying positions at opposite sides of said fork supporting unit, with a fork engaging said supporting unit in each operative position, means for projecting and retracting each retractable fork support, and means for elevating and lowering said fork unit on said fork supporting unit.

12. In combination, a power operated load supporting device, a cantilevered fork supporting unit carried by and projecting from said device and shiftable vertically to selected elevation and laterally in a substantially horizontal path to a selected position, a rigid fork unit pivotally supported on said supporting unit on a substantially horizontal axis substantially perpendicular to said lateral path, said fork unit including two sets of forks extending in angular relation to each other, a retractable support carried by each fork adjacent its free end, means for selectively pivoting said fork unit between two operative load-carrying positions at opposite sides of said fork-supporting unit, with one fork set alongside said supporting unit in each operating position, means for projecting and retracting each retractable fork support, and means operating simultaneously with said last named means for elevating said fork unit on said fork-supporting unit as said fork support is projected and lowering said fork unit on said fork-supporting unit as said fork support is retracted.

13. In combination, a power operated load transporting device, a cantilevered fork supporting unit carried by and projecting from said device and shiftable vertically to selected elevation and laterally in a substantially horizontal path to a selected position, a rigid fork unit pivotally supported on said supporting unit on a substantially horizontal axis substantially perpendicular to said lateral path, said fork unit including two sets of forks extending in angular relation to each other, a retractable support carried by each fork adjacent its free end, means for selectively pivoting said fork unit between two operative load-carrying positions at opposite sides of said fork-supporting unit, with one fork set engaging said supporting unit in each operative position, double acting fluid pressure means for projecting and retracting each retractable fork support, fluid pressure means for elevating and lowering said fork unit on said fork-supporting unit, and a fluid pressure system in which said double acting fluid pressure means and said last named fluid pressure means are connected for simultaneous correlated actuation.

14. In combination, a power operated load transporting device, a cantilevered fork supporting unit carried by said device and shiftable vertically to selected elevation and laterally in a substantially horizontal path to a selected position, a rigid fork unit pivotally supported on said supporting unit to swing in a substantially vertical plane transverse of said supporting unit, said fork unit including two sets of forks extending in angular relation to each other, a retractable support carried by each fork adjacent its end, means for selectively pivoting said fork unit between two operative load-carrying positions at opposite sides of said supporting unit and with a fork set abutting said supporting unit in each operative position, double acting fluid pressure means for projecting and retracting each retractable fork support, fluid pressure means for elevating and lowering said fork unit on said fork-supporting unit, a fluid pressure system in which said double acting fluid pressure means and said last named fluid pressure means are connected for simultaneous correlated actuation, and a valve in said fluid pressure system for relatively directing fluid in said system for delivery to the double acting fluid pressure means of forks in load-carrying position.

References Cited by the Examiner

UNITED STATES PATENTS

| | | | |
|---|---|---|---|
| 2,394,693 | 2/1946 | Golrick | 214—152 |
| 2,851,182 | 9/1958 | Gehring | 214—730 |
| 2,910,204 | 10/1959 | Wight | 214—730 |
| 2,924,345 | 2/1960 | Bodin | 214—148 |
| 2,941,686 | 6/1960 | Sylvester, et al | 214—730 |
| 2,984,985 | 5/1961 | MacMillin. | |
| 3,025,986 | 3/1962 | Arnold | 214—731 |
| 3,092,268 | 6/1963 | Powers | 214—75 |

FOREIGN PATENTS 750,207  6/1956  Great Britain.

GERALD M. FORLENZA, *Primary Examiner.*

MORRIS TEMIN, HUGO O. SCHULZ, *Examiners.*